(12) United States Patent
Niederstaetter et al.

(10) Patent No.: US 8,440,277 B2
(45) Date of Patent: May 14, 2013

(54) INTRINSICALLY STABLE SHIRRED STICK

(75) Inventors: Walter Niederstaetter, Eltville (DE); Gerhard Grolig, Moerfelden-Waldorf (DE); Dirk Auf Der Heide, Alfhausen (DE); Christian Auf Der Heide, Osnabrueck (DE); Stefanie Stalberg, Taunusstein-Wehen (DE)

(73) Assignee: Kalle GmbH, Wiesbaden (DE)

( * ) Notice: Subject to any disclaimer, the term of this patent is extended or adjusted under 35 U.S.C. 154(b) by 371 days.

(21) Appl. No.: 10/568,381

(22) PCT Filed: Aug. 23, 2004

(86) PCT No.: PCT/EP2004/009396
§ 371 (c)(1),
(2), (4) Date: Feb. 14, 2006

(87) PCT Pub. No.: WO2005/020694
PCT Pub. Date: Mar. 10, 2005

(65) Prior Publication Data
US 2006/0269705 A1    Nov. 30, 2006

(30) Foreign Application Priority Data
Aug. 27, 2003    (DE) ................................. 103 39 802

(51) Int. Cl.
A21D 13/00    (2006.01)

(52) U.S. Cl.
USPC ........ 428/34.8; 428/34.1; 428/35.7; 428/36.6; 428/36.92; 428/105; 428/132; 428/135; 428/138; 428/140; 138/118.1

(58) Field of Classification Search ............... 138/118.1; 428/34.8; 426/135, 412, 105; 452/32; 264/483; 204/165; 156/244.13
See application file for complete search history.

(56) References Cited

U.S. PATENT DOCUMENTS

| | | | |
|---|---|---|---|
| 3,451,827 A | 6/1969 | Bridgeford | 99/176 |
| 3,898,348 A | 8/1975 | Chiu et al. | 426/413 |
| 4,137,947 A | 2/1979 | Bridgeford | 138/118.1 |
| 4,391,302 A * | 7/1983 | Huhn et al. | 138/118.1 |
| 4,888,223 A | 12/1989 | Sugimoto et al. | 428/34.9 |
| 4,897,295 A * | 1/1990 | Erk et al. | 428/34.8 |
| 5,358,784 A | 10/1994 | Hammer et al. | 428/34.8 |
| 5,399,427 A * | 3/1995 | Stenger et al. | 428/34.8 |
| 5,616,418 A * | 4/1997 | Vasselin et al. | 428/474.7 |
| 5,773,059 A * | 6/1998 | Delius et al. | 426/129 |
| 5,928,738 A | 7/1999 | Auf Der Heide et al. | 428/34.8 |
| 6,086,929 A | 7/2000 | Stall | 426/92 |
| 6,194,040 B1 | 2/2001 | Delius et al. | 428/34.8 |
| 6,203,750 B1 * | 3/2001 | Ahlgren et al. | 264/514 |
| 7,001,635 B2 * | 2/2006 | Merritt et al. | 426/412 |
| 2002/0039611 A1 | 4/2002 | Grolig et al. | 426/135 |
| 2003/0165645 A1 * | 9/2003 | Heide et al. | 428/34.8 |
| 2004/0062834 A1 * | 4/2004 | Cruz | 426/5 |
| 2004/0191368 A1 * | 9/2004 | Mori et al. | 426/105 |

FOREIGN PATENT DOCUMENTS

| | | |
|---|---|---|
| DE | 196 25 194 A1 | 1/1998 |
| DE | 100 09 979 | 9/2001 |
| DE | 101 25 207 A1 | 11/2002 |
| EP | 0180 207 A2 | 5/1986 |
| EP | 1013173 A2 | 5/1986 |
| EP | 0 573 306 A2 | 12/1993 |
| EP | 0 589431 | 3/1994 |
| EP | 0 640289 A1 | 3/1995 |
| EP | 0 640 289 A2 | 6/2000 |
| EP | 1 013 173 A1 | 6/2000 |
| EP | 1 338 204 A1 | 8/2003 |
| JP | 2002306059 * | 10/2002 |
| WO | WO 98/17120 | 4/1998 |
| WO | 02/082913 A1 | 10/2002 |

OTHER PUBLICATIONS

G. Effenberger, Wursthüllen—Kunstdarm "Sausage casings, artificial sausage skin", Holzmann-Buchverlag, Bad Wörishofen, $2^{nd}$ Edition [1991] pp. 58-60.

* cited by examiner

Primary Examiner — Ellen S Wood
(74) Attorney, Agent, or Firm — ProPat, L.L.C.

(57) ABSTRACT

Disclosed is an intrinsically stable shirred, tubular, single-layer or multilayer food casing that preferably has a sigma-5 value (longitudinal/transversal, measured in a moist state) of less than 20/20 $N/mm^2$. Said casing is preferably shirred at a ratio of 100:1 or more, preferably 120:1 to 500:1, and is essentially made of synthetic polymers. The shirred casing can be stored and transported without using a net-type envelope and is particularly suitable for processing on fully automatic sausage stuffing, portioning, clipping, and twisting devices.

21 Claims, No Drawings

INTRINSICALLY STABLE SHIRRED STICK

CROSS-REFERENCE TO RELATED APPLICATIONS

This application is being filed under Rule 1.371 as a National Stage Application of pending International Application No. PCT/EP2004/009396, which claims priority to the following parent application: German Patent Application No. 103 39 802.3 filed Aug. 27, 2003. Both International Application No. PCT/EP2004/009396 and German Patent Application No. 103 39 802.3 are hereby incorporated by reference herein in their entirety.

FIELD OF THE INVENTION

The invention relates to an intrinsically stable shirred tubular food casing, and also to the use of the shirred casing on fully automatic stuffing apparatuses, in particular automatic sausage stuffing and clipping devices or twisting apparatuses.

BACKGROUND OF THE INVENTION

Food casings, especially sausage casings, are predominantly offered in shirred form. In each case about 10 to 200 m of the casing are shirred to form a 5 to 200 cm long stick. Shirring artificial sausage skin has long been known and numerously described. On an industrial scale, shirring is performed using special machines. The casing which is delivered as roll product is taken off from the roll, inflated and pulled onto the shirring mandrel of the shirring machine. The outer diameter of the shirring mandrel determines the inner diameter of the stick to be produced. Shirring is a high stress load for the casing. Thus, too high a shirring ratio frequently leads to damage of the casing. To make the casing more supple and to reduce the mechanical friction load of the shirring systems, it is therefore customarily sprayed or wetted, immediately before shirring, or during shirring, from the inside, from the outside, or from both sides, with water, oil or an oil-in-water emulsion. This measure further prevents cracks or damage occurring at the pleats forming during shirring. The food casings thus produced are predominantly provided after the shirring process with a net-type or reinforcing packaging, so that the casings can be handled in the further processing procedure.

Cellulose-based food casings shirred in this manner have already been known for a long time. They may also be shirred in such a manner that intrinsically stable sticks are formed which are suitable for fully automatic further processing (DE-A 100 09 979). The casings are used in particular as peelable skin, for example in the production of small sausages. Cellulose skins are always shirred in the moist state. After the stick has been pulled off the shirring rod, a dimensionally stable or self-supporting shirred stick is present.

Shirred sticks made of tubular polymer-based food casings are also known. These shirred sticks, however, are generally not very stable without net-type or reinforcing packaging (see G. Effenberger, Wursthüllen-Kunstdarm [Sausage casings, artificial sausage skin], 2nd Edition [1991] pp. 58-60). In order to be able to ensure the dimensional stability of these shirred sticks, these food casings, after the shirring process, are given a reinforcing packaging. The different embodiments can comprise, e.g. shirring sleeves, tubing or net-type packaging. For transport, the shirred sticks with or without shirring sleeve are generally enclosed by a pouch or a tubular net. The shirring pleats of the polymer-based casings show a relatively high resilience, which leads to the fact that the shirred sticks without reinforcing packaging do not retain their original shape, but expand again. As a result, the mechanical intrinsic stability of the casings decreases, however, so that they can no longer be used on fully automatic stuffing apparatuses. Frequently, the skin shirred onto a sleeve is therefore fixed using limiting disks. The previously known shirred sticks, at least those without shirring sleeve, must therefore be opened either by hand or at least pushed onto the stuffing horn by hand, and then freed again from the respective reinforcing packaging which makes fully automatic operation impossible.

DE-A 196 25 094 A1 (U.S. Pat. No. 5,928,738) discloses a biaxially stretch-oriented and heatset single-layer or multilayer stick form polyamide-based packaging casing which has a shirring density of up to 1:200 at a length of the shirred stick of 40 to 100 cm, and also a method for producing such a packaging casing. The wall thickness of the packaging casing is in a range from 10 to 50 µm. Before this packaging casing is shirred, a spray solution is applied, which spray solution contains, as shirring lubricant, an emulsifier, paraffin oil or similarly active agent.

Shirred sticks having a compression ratio of up to about 150 made of an at least three-layer tubular casing are disclosed by EP-A 1 013 173. The casing has one polyamide layer each on the inside and outside. Between these layers is situated a water vapor-barrier layer, for example based on polyolefin. The casings, before shirring, are sprayed on the outside with water which can additionally contain a fungicide or preservative, and then stored in a water vapor-tight packaging, so that the water can migrate into the external polyamide layer. It is premoistening which permits the shirring with said high compression ratio.

In the older application, which was unpublished at the priority of the present application, EP-A 1 338 204, a packaging casing is disclosed which is shirred at a shirring ratio of 1:200 or higher. The high shirring ratio is achieved by the surface of the casing and that of the shirred stick together having a mean surface roughness of 0.5 to 5.0 µm. This achieves the shirred stick being able to be taken off from the shirring rod without damage. Preferably, here also, the casing is sprayed before shirring with a solution which comprises a shirring lubricant.

In the abovementioned documents, shirred sticks having high compression rates are described. Still-present resilience of the shirring pleats, the shirred sticks, however, are not intrinsically stable and are therefore customarily provided with a reinforcing packaging.

SUMMARY OF ADVANTAGEOUS EMBODIMENTS OF THE INVENTION

The object was therefore still to provide a shirred stick made of a tubular polymer-based food casing which does not require additional reinforcing packaging of the previously known sticks and which can be further processed without problems on fully automatic stuffing apparatuses. The shirred stick, without shirring sleeve or other separate support, is to be so stable and retain a substantially straight shape that it can be taken from a transport container and, e.g., can be placed into the storage vessel (hopper) of the stuffing machine, in which the stick is fully automatically fed to the stuffing horn.

DETAILED DESCRIPTION OF ADVANTAGEOUS EMBODIMENTS OF THE INVENTION

It has been found that tubular casings based on synthetic polymers can also be shirred to form intrinsically stable sticks if they experience, enough compression of the shirring operation in the shirring pleating, sufficient folding stress which does not recover. Surprisingly, it has been found, that also thick-walled casings having non-elastic characteristics develop this intrinsic stability if, in the compressed state, they are set for a period (up to 24 hours). This setting can be carried out, for example, via a reinforcing packaging or storage under vacuum in a close-fitting, air-tight film packaging. In this time, owing to the setting of the shirring pleats, the tension or the resilience recedes completely. The breakdown of this resilience in particularly thin and soft or elastic materials at the same time as the compression in the currently customary and employed shirring processes is likewise surprising. Furthermore, it has been found that particularly high insensitivity to bending and folding stress can be achieved by a targeted shirring pleating. In this case, the contact surface area and frictional surface area enlargement of the shirring pleats among one another is of particular importance. This contact surface area enlargement can be achieved, in particular, via overlapping shirring, as achieved in an ideal manner by a screw shirring method. In addition, it has been found that the intrinsic stability of the shirred stick can be still further increased by an adhesion-promoting treatment or impregnation of the casing surface, for example by an oil or water film. This may also be achieved by a corona treatment. In the shirred sticks, the casing exhibits only very low resilience, or none at all, so that the pleats formed on shirring can no longer open. The shirred pleats retain rather their shape once achieved.

The present invention therefore relates to an intrinsically stable shirred tubular single-layer or multilayer food casing which essentially consists of synthetic polymers and, without net-type or reinforcing packaging, has sufficient intrinsic stability to be processed on fully automatic stuffing machines. The casing is preferably compressed in a ratio of 100:1 or more.

In a preferred embodiment, the sigma-5 value (longitudinal/transverse, measured wet) is below 20/20 $N/mm^2$, particularly preferably in the range from 2/2 to 10/10 $N/mm^2$.

The low resilience or the absence of resilience can be recognized from the fact that the casing, after shirring, extends in the longitudinal direction by no more than 15%, preferably by no more than 10%, particularly preferably by no more than 5%, when it is stored on a smooth, planar support, usually on a glass plate, without net-typ or film packaging or the like, at room temperature (i.e. 23° C.) and 60% relative humidity (rh).

The mechanical stability of the inventive shirred stick is demonstrated, for example, in the fact that it bends under the effect of its own weight by no more than 20%, preferably by no more than 5%, based on the length between two support points, (storage at room temperature and 60% rh). A correspondingly long stick which is mounted on two support points which lie 30 cm apart therefore bends under said conditions by no more than 6 cm, preferably by no more than 1.5 cm. A shirred stick which is stable in such a manner meets the conditions for fully automatic processing.

The inventive casing is preferably single-layered. It generally has a wall thickness of no more than 90 µm, particularly preferably from 15 to 30 µm. The casing is generally shirred in a ratio of 100:1 or more, i.e. for example 50 m of the casing give a shirred stick of at most 50 cm in length (=compression ratio of at least 100:1). Preferably, the compression ratio is even higher still, for instance in the range from 120:1 to 500:1. Methods and apparatuses used for producing the shirred sticks having such a high compression ratio are disclosed, for example, in EP-A 1 338 204 which was unpublished at the priority of the present application.

An important constituent of the casing is preferably "soft" synthetic polymers or polymer mixtures. To these belong aliphatic polyamides and aliphatic copolyamides such as nylon 6/66 (obtainable, for example, under the name ULTRAMID® C4 from BASF AG) or nylon 6/12 (obtainable, for example, under the names GRILON® CF6S or GRILON® BM 13 from Ems Chemie AG), polyether block amides (e.g. GRILON® FE 7012 or PEBAX® MH 1657 from Elf Atochem S.A.). In combination with other polymers, the casing can also comprise water-soluble polymers, such as polyvinylpyrrolidone or partially or completely saponified polyvinylacetate. Suitable polymers are also ionomers, such as ethylene/(meth)acrylic acid copolymers, or (meth)acrylic ester polymers (especially ethylene/methyl acrylate copolymers, ethylene/ethyl acrylate copolymers or ethylene/butyl acrylate copolymers). Further suitable polymers for the inventive casing are polyurethanes (e.g. IROGRAN® VP 456/40), copolyesters (e.g. ARNITEL® PM 381 or PM 581) and biodegradable polyesters (e.g. ECOFLEX®).

Alternatively, or in addition, the required soft quality of the casing can also be achieved by adding monomeric plasticizers. These are, for example, dimethylsulfoxide (DMSO), butane-1,3-diol, glycerol, water, ethylene glycol, propylene glycol, butylene glycol, diglyceride, diglycol ether, formamide, N-methylformamide, N,N-dimethylformamide (DMF), N,N-dimethylurea, N,N-dimethylacetamide, polyalkylene oxide, glycerol mono-, di- or triacetate, sorbitol, erythritol, mannitol, gluconic acid, galacturonic acid, glucaric acid, glucuronicacid, polyhydroxycarboxylicacids, glucose, fructose, sucrose, citric acid and citric acid derivatives and also any desired mixtures thereof. Some of said plasticizers can also be applied to the already fabricated food casing. For example, the casing can be passed through an aqueous plasticizer bath which contains glycerol.

In a particular embodiment, the adhesion of the individual shirred pleats to one another is increased, for example by a corona treatment. The surface tension after this treatment is expediently 40 to 50 mN/m, preferably 50 to 70 mN/m.

The casing preferably has a nominal caliber of no more than 40 mm. It is thus suitable in particular for use as peeling skin. However, polymer casings having a greater caliber can also be processed to form intrinsically stable sticks.

The water vapor permeability of the casing is essentially determined by type and fraction of the synthetic polymers used. Generally, the water vapor permeability is 5 to 1000 $g/m^2 d$, preferably 20 to 400 $g/m^2 d$, particularly preferably 50 to 200 $g/m^2 d$, determined as specified in DIN 53 122 at 23° C.

Expediently, the shirred food casing is closed at one end, for example by a metal or plastic clip. The closure at one end can also be performed by twisting the casing itself or by welding or gluing.

Shirring machines and shirring apparatuses for producing the inventive intrinsically stable shirred casing are known and are described, for example, in the abovementioned EP-A 1 338 204. The shirring elements form, for example, a spiral, axial or screw system. They lead to the formation of shirred pleats which are essentially directed perpendicular to the machine direction, or of those which are at an incline and substantially overlap one another. Shirred sticks having the last-mentioned pleat structure are generally preferred. They may be produced particularly expediently using a screw system.

If appropriate, before the shirring or during the shirring, a shirring lubricant is applied to the tubular casing. Expediently, this agent is sprayed onto the inside and/or the outside.

A particularly suitable shirring lubricant is, for example, paraffin oil. Depending on the type of the casing, it can also be employed in the form of an oil-in-water emulsion. An impregnation can also be applied to the inside of the casing, which impregnation specifically controls the sausage emulsion adhesion and e.g. improves the peeling of the casing.

By means a temporary setting of the shirring geometry and the resultant breakdown in tension of the shirred pleats, the required intrinsic stability of the stick is achieved.

The example hereinafter serves to illustrate the invention.

EXAMPLE

A single-layered soft smokeable polymer casing made of 20% by weight polyether block amide, 20% by weight polyvinyl alcohol and 60% by weight nylon 6/66 having a $\sigma_5$ value of 2/2 N/mm² (longitudinal/transverse) and a water vapor permeability of 200 g/m² d (determined as specified in DIN 53 122 at 23° C.; moisture gradient 85%/0% rh) was pre-moistened with water on a rewinder. In each case 24.4 m of the casing were then shirred on a shirring machine having an axial shirring system to give an intrinsically stable stick of 17.5 cm in length. During the shirring operation, the outside of the casing was sprayed with paraffin oil. An impregnation to improve the peeling properties was sprayed onto the inside (via a shirring mandrel equipped with spray nozzles). A plurality of the sticks were packed into a pouch using an automatic packing system and welded under vacuum.

The sticks were then removed from the pouch and placed into the feed hopper of a fast-running stuffing machine (Frank-A-Matic), from where they were fully automatically fed to the stuffing horn. In this manner, up to 2 tons of sausage emulsion could be processed per hour to small sausages of a caliber of 24 mm. Subsequently, the small sausages, as customary, were smoked and cooked. After cooling, the casing was peeled off on an automatic unit; the then casing-less small sausages were then placed in glass jars and sealed.

An equally long (17.5 cm) stick of a cellulose-based peeling skin comprises, in contrast, generally only 12.19 m of tubular casing. By means of the inventive shirred stick, the stuffing performance could therefore be increased by 25%.

In addition, the invention relates to the use of the shirred food casing on a fully automatic stuffing apparatus, preferably on fully automatic sausage stuffing, portioning, clipping and twisting apparatuses.

The invention claimed is:

1. An intrinsically stable shirred tubular single-layer food casing consisting essentially of a mixture of synthetic polymers, said mixture of polymers comprising (i) amide polymer consisting of aliphatic copolyamide including nylon 6/66 and/or nylon 6/12, and (ii) at least one further polymer selected from the group consisting of polyurethanes, polyether block amides, copolyesters, biodegradable polyesters, and water-soluble polymers,
   said food casing having, without separate support, sufficient intrinsic stability to be processed on fully automatic stuffing machines,
   wherein said shirred food casing bends under the effect of its own weight by no more than 20%, based on the length between two support points and at room temperature, said food casing further exhibits a water vapor permeability of 5 to 1000 g/m² d determined as specified in DIN 53 122 at 23° C., said food casing is compressed in a ratio of 100:1 or more with overlapping, inclined shirring pleats,
   and the food casing water vapor permeability is essentially imparted by the synthetic polymers.

2. An intrinsically stable shirred tubular single-layer food casing as claimed in claim 1 consisting essentially of synthetic polymers and having a sufficient intrinsic stability to be processed on fully automatic stuffing machines, wherein said shirred food casing has a sigma-5 value (longitudinal/transverse, measured wet) of from 2/2 to 10/10 N/mm².

3. The shirred food casing as claimed in claim 1, wherein, after shirring, said casing extends in the longitudinal direction by no more than 15% when stored on a smooth planar support at room temperature and 60% rh.

4. The shirred food casing as claimed in claim 1, wherein said shirred food casing has a wall thickness of no more than 90 μm.

5. The shirred food casing as claimed in claim 1, wherein said shirred food casing contains soft synthetic polymers or polymer mixtures.

6. The shirred food casing as claimed in claim 1, wherein said shirred food casing is plasticized by at least one monomeric plasticizer.

7. The shirred food casing as claimed in claim 1, wherein said shirred food casing has a nominal caliber of no more than 40 mm.

8. The shirred food casing as claimed in claim 1, wherein the casing is corona-treated on the outside.

9. The shirred food casing as claimed in claim 1, wherein said shirred food casing is closed at one end.

10. The shirred food casing as claimed in claim 1, wherein the casing is permeable to cold smoke, warm smoke, or hot smoke.

11. The shirred food casing as claimed in claim 1, wherein said shirred food casing achieves the required intrinsic stability by a temporary setting of the shirring geometry and the resultant breakdown in tension of the shirred pleats,
   the intrinsic stability is promoted by an adhesion-promoting treatment or impregnation consisting of one or more of oil or water,
   and said food casing has optionally been corona-treated.

12. The shirred food casing as claimed in claim 1, wherein said shirred food casing extends in the longitudinal direction by no more than 10% when stored on a smooth planar support at room temperature and 60% rh after shirring.

13. The shirred food casing as claimed in claim 1, wherein said shirred food casing bends under the effect of its own weight by no more than 5%, based on the length between two support points, at room temperature.

14. The shirred food casing as claimed in claim 1, wherein said shirred food casing comprises plasticizer selected from dimethylsulfoxide, butane-1,3-diol, glycerol, water, ethylene glycol, propylene glycol, butylene glycol, diglyceride, diglycol ether, formamide, N-methylformamide, N,N-dimethylformamide, N,N-dimethylurea, N,N-dimethylacetamide, polyalkylene oxide, glycerol mono-, di- or triacetate, sorbitol, erythritol, mannitol, gluconic acid, galacturonic acid, glucaric acid, glucuronic acid, polyhydroxycarboxylic acids, glucose, fructose, sucrose, citric acid, a citric acid derivative, or mixtures thereof.

15. An intrinsically stable shirred tubular single-layer food casing consisting essentially of synthetic polymers, including amide polymer consisting of aliphatic copolyamide selected from nylon 6/66 and/or nylon 6/12 and water soluble polymer, and having sufficient intrinsic stability to be processed on fully automatic stuffing machines, wherein said shirred casing further comprises at least one of (i) an outer coating of oil or water and (ii) an outer surface tension of 40 to 50 mN/m imparted by corona treatment increasing the adhesion of the shirred pleats to one another, said shirred casing extends in the longitudinal direction by no more than 10% when it is stored on a smooth, planar support, without packaging, at room temperature and 60% relative humidity, said food casing has overlapping, inclined shirring pleats and said casing is premoistened with water alone prior to shirring.

16. An intrinsically stable shirred tubular single-layer food casing as claimed in claim 1, wherein the synthetic polymers are a mixture consisting of (i) a single copolyamide; (ii) polyether block amide; and (iii) water-soluble polymer, wherein the water-soluble polymer is partially or completely saponified polyvinylacetate.

17. An intrinsically stable shirred tubular single-layer food casing as claimed in claim 1, wherein the water-soluble polymer is polyvinylpyrrolidone.

18. An intrinsically stable shirred tubular single-layer food casing consisting essentially of a mixture of synthetic polymers, said mixture of polymers comprising (i) amide polymer consisting of aliphatic copolyamide including nylon 6/66 and/or nylon 6/12 and (ii) at least one further polymer selected from the group consisting of polyurethanes, polyether block amides, copolyesters, biodegradable polyesters, and water-soluble polymer, said food casing having, without separate support, sufficient intrinsic stability to be processed on fully automatic stuffing machines, wherein said shirred food casing bends under the effect of its own weight by no more than 20%, based on the length between two support points and at room temperature, said food casing further exhibits a water vapor permeability of 5 to 1000 g/m$^2$ determined as specified in DIN 53 122 at 23° C., said food casing is compressed in a ratio of 100:1 or more with overlapping, inclined shirring pleats, the food casing water vapor permeability is essentially imparted by the synthetic polymers and the shirred food casing has a sigma-5 value (longitudinal/transverse, measured wet) of below 20/20 N/mm$^2$.

19. An intrinsically stable shirred tubular single-layer food casing as claimed in claim 1, wherein said polymers comprises (i) amide polymer consisting of nylon 6/66 and/or nylon 6/12, and (ii) at least one further polymer selected from the group consisting of polyurethanes, polyether block amides, copolyesters, biodegradable polyesters, and (iii) water-soluble polymer.

20. An intrinsically stable shirred tubular single-layer food casing as claimed in claim 1, wherein said food casing exhibits a water vapor permeability of 20 to 400 g/m$^2$ d determined as specified in DIN 53 122 at 23° C.

21. An intrinsically stable shirred tubular single-layer multilayer food casing consisting essentially of a mixture of synthetic polymers, said mixture of polymers comprising (i) amide polymer consisting of aliphatic copolyamide including nylon 6/66 and/or nylon 6/12, and (ii) at least one further polymer selected from the group consisting of ionomers, polyurethanes, polyether block amides, copolyesters, biodegradable polyesters, and water-soluble polymers, said food casing having, without separate support, sufficient intrinsic stability to be processed on fully automatic stuffing machines, wherein said shirred food casing bends under the effect of its own weight by no more than 20%, based on the length between two support points and at room temperature, said food casing is compressed in a ratio of 100:1 or more with overlapping shirring pleats positioned at an incline to said food casing, the food casing water vapor permeability is essentially imparted by the synthetic polymers and said casing further comprises a shirring lubricant.

* * * * *

UNITED STATES PATENT AND TRADEMARK OFFICE
CERTIFICATE OF CORRECTION

PATENT NO. : 8,440,277 B2  
APPLICATION NO. : 10/568381  
DATED : May 14, 2013  
INVENTOR(S) : Niederstaetter et al.

Page 1 of 1

It is certified that error appears in the above-identified patent and that said Letters Patent is hereby corrected as shown below:

In the Claims:

Column 7  
Claim 18, Line 32, delete "1000 g/m$^2$ determined" insert --1000 g/m$^2$ d determined--

Column 8  
Claim 21, Line 15–16, delete "single-layer multilayer" insert --single-layer or multilayer--

Signed and Sealed this  
Twenty-fifth Day of June, 2013

Teresa Stanek Rea  
*Acting Director of the United States Patent and Trademark Office*